Dec. 12, 1967  T. L. RICHTER  3,357,268
OPTICAL CELL
Filed May 1, 1964
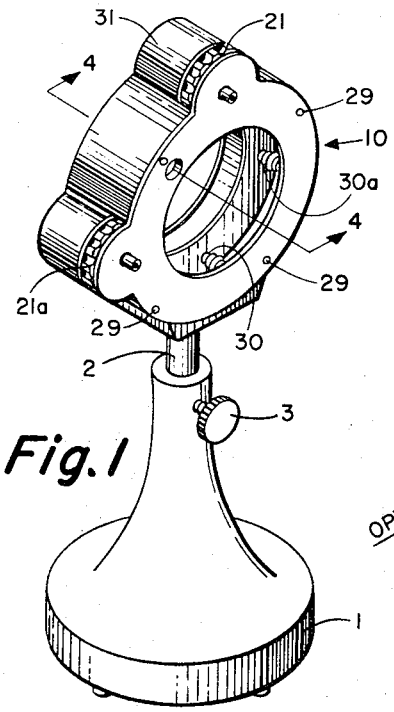
Fig. 1
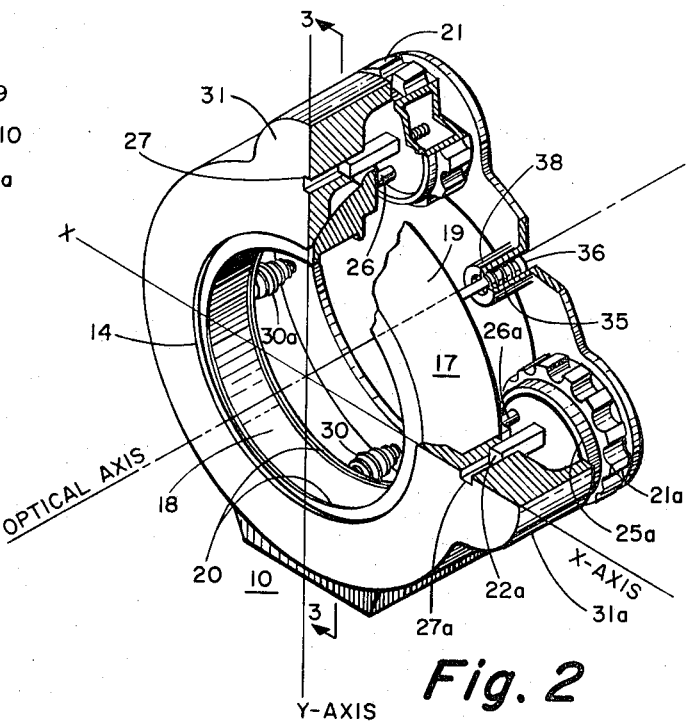
Fig. 2
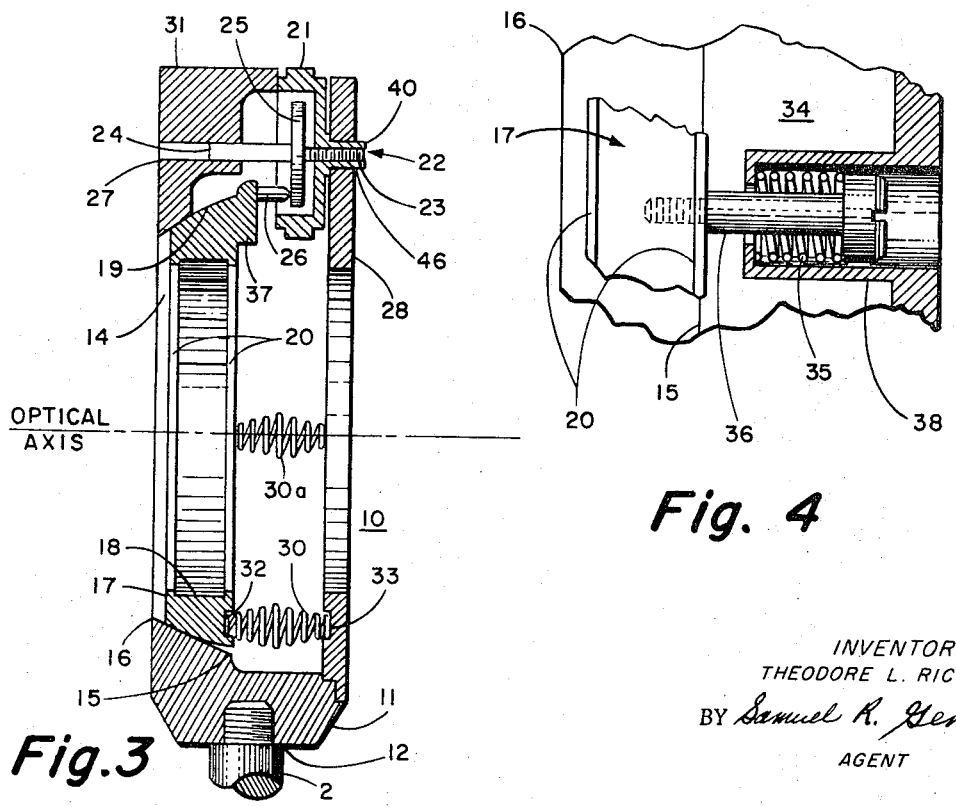
Fig. 3
Fig. 4
INVENTOR
THEODORE L. RICHTER
BY Samuel R. Genca
AGENT

United States Patent Office 3,357,268
Patented Dec. 12, 1967

3,357,268
OPTICAL CELL
Theodore L. Richter, Rochester, N.Y., assignor to General Dynamics Corporation, a corporation of Delaware
Filed May 1, 1964, Ser. No. 364,127
5 Claims. (Cl. 74—89.15)

The present invention relates to optical apparatus, and particularly to optical cells.

The present invention is generally useful for precision alignment of mirrors, lenses, and beam splitters. The invention, however, is especially suitable for use in constructing laser optical cavities of the confocal or semi-concentric type and for use in modifying Fabry-Perot interferometers.

Some lasers include an optical cavity having diametrically opposed parallel reflecting plates forming an optical system called in the art, a Fabry-Perot interferometer. The parallel reflecting plates reflect coherent light between the plates. Only light that travels back and forth along the axis of the parallel reflecting plates is amplified by the laser in the optical cavity. However, light traveling in any other direction may miss one or the other of the parallel reflecting plates and may be lost. Thus, only on-axis coherent light is strongly amplified. Useful amplified coherent light is transmitted from the optical cavity by making a portion of one of the reflecting plates partially transmitting in a region of the plate at or near the axis thereof. Successful operation of the laser cavity is highly dependent on the establishment of a parallel relationship between the reflecting plates in the optical cavity.

Attempts have been made in the past to provide fine adjustments of the plates in the optical cavity over an adequate range of angular adjustment by delicate array of springs, bellows, hinges, and leveling screws. For example, such attempts have included two sets of counter-acting diametrically opposed leveling screws for tilting a reflecting plate about two orthogonal axes such as the type used in a surveyor's transit. Manipulation of four leveling screws to effect the proper angular disposition of the reflecting plates is a slow and time consuming process. Further disadvantages in such arrangements are that they require the use of both hands for only one adjustment; and furthermore, one hand may have to be positioned so as to interrupt the light beam. Certain coherent laser light beams in laser applications may cause serious harm to the operator.

Other attempts to align the reflecting plates include expensive rigid mechanical structures having magnetostrictive longitudinal bars for aligning the reflecting plates. A coil is around each of the longitudinal magnetostrictive bars for distorting the magnetostrictive rigid structure in response to the application of an electrical current to the coils. Although very fine adjustments can be made with a rigid magnetostrictive frame structure, such frames are expensive to manufacture and only very fine adjustments are readily obtained therewith.

Accordingly, it is a general object of the present invention to provide an improved optical cell in which the foregoing difficulties and disadvantages are overcome.

It is another object of the present invention to provide an optical cell possessing a maximum degree of mechanical stability and a minimum susceptibility to thermal effects.

It is another object of the present invention to provide an optical cell for precision alignment of mirrors, lenses, beam splitters, Fabry-Perot plates, and the like.

It is yet another object of the present invention to provide an optical cell for the alignment of mirrors, lenses, Fabry-Perot plates about two substantially orthogonal axes by the movement of one leveling screw for each axis.

It is a further object of the present invention to provide an optical cell which can be used singly or in multiple combination for constructing improved modification of the Fabry-Perot interferometer.

It is a still further object of the present invention to facilitate the construction of lasers.

An optical cell according to an embodiment of the invention, can be mounted on its own base or mounted as an integral part of an optical apparatus such as the optical cavity in a laser device. The optical cell includes a frame having an opening which tapers inwardly towards its axis and has a given diameter at a proximal end and a diameter smaller than the given diameter at a distal end of the opening. An optical support ring member having means for supporting an optical unit such as a mirror, lens or reflecting plate is included within the frame opening. The ring member has an arcuate periphery adapted to be swiveled between the proximal end and distal end of the opening into various positions relative to the frame. The ring member may be locked into any stable position by urging the ring member on at least two control points towards the distal end of the opening in the frame. Further included are first and second control means mounted substantially orthogonal to each other on the frame and coupled to the ring member at two sets of diametrically opposed control points on the ring member. Each of the first and second control means yieldingly urges the ring member towards the distal end of the opening and also tilts the ring member into various stable positions by selectively applying a force at one control point on the ring member. Also included are spring means coupled to the frame and the ring member at a point between two of the control points on the frame. The spring means yieldingly urge the ring member away from the distal end of the opening to prevent locking of the ring member when either of the first and second control means is operated. The spring means also coacts with the first and second control means to tilt the ring member into any stable position.

Other objects and advantages of the present invention will become apparent from the ensuing description of an illustrative embodiment thereof in the course of which reference may be had to the accompanying drawings in which:

FIG. 1 is a perspective view of the optical cell embodying the features of the invention, FIG. 2 is an enlarged, fragmentary perspective view showing in greater detail the optical cell illustrated in FIG. 1, FIG. 3 is a sectional view taken through line 3—3 in FIG. 2 viewed in the direction of the arrows, and FIG. 4 is another enlarged fragmentary sectional view of the optical cell shown in FIG. 1 along the line 4—4 when viewed in the direction of the arrows.

Referring more particularly to the drawings, an optical cell 10 is shown mounted on a base 1 having a post 3 and a height adjustment screw 2. Although the optical cell 10 is shown mounted on the base 1, the optical cell 10 may be mounted in various other ways on optical apparatus without departing from the spirit of the invention. The optical cell 10 comprises a frame 11 having a threaded portion 12 (FIG. 3) for receiving the post 2. The post 2 is slideably mounted on the base 1 so as to vary the height of the optical cell 10 relative to the base 1. The frame 11 includes an opening 14 of uniformly varying diameter. The opening 14 has a substantially smooth peripheral surface (i.e. the periphery of the opening 14 defines the frustum of a cone). The opening 14 has a proximal end 15 of a given diameter and a distal end 16 having a diameter smaller than the given diameter at the proximal end 15 of the opening 14. The opening 14 thus tapers inwardly toward the axis from the proximal and distal ends 15 and 16 respectively and provides a seat for an optical support ring member 17.

Disposed between the proximal end 15 and distal end 16 of the opening 14 is the optical support ring member 17. The optical support ring member 17 has a central opening 18 for receiving and supporting an optical unit, not shown, such as a mirror, lens or Fabry-Perot Plate. The optical unit may be held in the opening 18 on a three-point mounting by a spring clip not shown. The central opening 18 of the ring member 17 also includes ridges 20 (FIG. 2) for receiving the spring clip or any other retaining means well known to those skilled in the art for securing the optical unit in the opening 18.

The ring member 17 further includes an arcuate peripheral portion 19 (FIG. 3) contiguous to the smooth surface of the opening 14. The ring member 17 is adapted to swivel in the opening 14 of the frame 11. The ring member 17 may be locked in various positions in the opening 14 by applying a force on two diametrically opposite points on the ring member in a direction towards the distal end 16 of the opening 14. This locking is due to the taper of the opening 14 and the friction between the surface of the opening 14 and the peripheral portion 19 of the ring member 17.

The optical cell 10 also includes first and second control means for selectively swiveling the ring member about two substantially orthogonal axes (shown as the X and Y axes) and for applying the necessary force mentioned above to lock the ring member 17 in opening 14. The first control means is shown more in detail in FIG. 3. The first control means includes a control knob 21 and a leveling screw 22 having a threaded portion 23 on one end, a rectangular shank portion 24 on the other end and a platen 25 between the threaded portion 23 and rectangular shank portion 24. Also included in the first control means is a pusher pin 26 secured to an embossed portion 37 of the ring member 17. The pusher pin 26 coacts with the platen 25. The leveling screw 22 is slideably supported on the rectangular shank portion 24 in a rectangular opening 27 in a boss 31 on the frame 11. The threaded portion 23 of the screw 22 is supported by a corresponding threaded stub 40 in control knob 21. A plate 28 which is fastened to the frame 11 by screws 29 supports the stub 40 for rotation in a hole 46 in the plate 28. The plate 28 is part of the frame 11. The control knob 21 is free to rotate about the leveling screw 22 but is held captive between the frame 11 and the plate 28 so that, for any rotation of the control knob 21, the leveling screw 22 moves linearly. The rectangular shank portion 24 of the leveling screw 22 prevents rotation of the leveling screw 22 so that as control knob 21 is rotated, the leveling screw 22 slides in the rectangular opening 27. When the leveling screw 22 travels towards the distal end 16, the platen 25 pushes pin 26 and tilts the ring member 17 in the direction towards the distal end of the opening 14 about the X-axis and in turn tilts the optical axis downwardly.

The ring member 17 may be tilted in the opposite direction (upwardly) about the X-axis of the optical cell 10 by a compression spring 30 mounted diametrically opposite to the leveling screw 22. The compression spring 30 is disposed between the plate 28 and ring member 17 and is held in this position between holes 32 and 33 in ring member 17 and plate 28, respectively. The spring 30 yieldingly urges the ring member 17 towards the distal end 16 of the opening 14 and also yieldingly urges the pin 26 against the platen 25. Thus the spring 30 coacts with the platen 25 to force the ring member 17 towards the distal end 16 of the opening 14 and frictionally lock the ring member 17 in any given stable position in the opening 14 once it is moved into this stable position. The spring 30 may also coact with the ring member 17 and platen to tilt the ring member 17 about the X-axis when the platen 25 moves away from the pusher pin 26. However, the above forces acting as the ring member 17 may not be compatible with each other since the forces exerted by the spring 30 tending to lock the ring member 17 in opening 14 may not yield to the forces exerted by the spring 30 when the knob 21 is turned in either direction to tilt the ring member 17 about the X-axis. Hence the problem is to make the forces which lock the ring member 17 in the opening 14 and the forces which tilt the ring member about the X-axis compatible.

A feature of the invention is spring means 34 connected between the plate 28 and ring member 17 and displaced from the platen 25. The spring means 34 is shown in detail in FIG. 4. The spring means 34 includes a spring 35, a guide bolt 36 fixed to the ring member 17 and a recessed housing 38 in plate 28. The spring means 34 yieldingly exerts an off-center force on the ring member 17 in a direction which tends to withdraw the ring member 17 away from the distal end 16 of the opening 14 and yieldingly urges the pusher pin 26 against the platen 25. It has been found in practice that the ring member 17 can be tilted in both directions about the X-axis smoothly in response to movement of the leveling screw 22 and can be retained in any given stable position once moved. The force exerted by the spring means 34 is considerably less than the force exerted by compression spring 30 since the spring means 34 acts at a point on the ring member 17, which point is off-center and therefore has a mechanical advantage.

The second control means is similar to the first control means and lies along the X-axis which is substantially orthogonal to a line drawn through leveling screw 22 and compression spring 30 of the first control means. The second control means includes a control knob 21a, a leveling screw 22a having a platen 25a, a pusher pin 26a, and a compression spring 30a, all of which correspond to the elements of the first control means and have been assigned the same numerals with a letter a after the numerals in order to better describe the operation of the optical cell 10. The first control means is disposed along the Y-axis of the optical cell 10 and controls movement of the ring member 17 about the X-axis while the second control means is disposed along the X-axis and controls movement of the ring member about the Y-axis.

The spring means 34 also coacts with the second control means in the same manner as it coacts with the first control means so that only one spring means 34 is required for the first and second control means. This is advantageous, since a minimum number of parts are required.

In the operation of the optical cell 10, rotation of the control knob 21 of the first control means in one direction will cause the leveling screw 22 and platen 25 to travel linearly in a direction towards the distal end 16 of the opening 14 while rotation of the control knob 21 in the opposite direction will cause the leveling screw 22 and platen 25 to travel away from the distal end 16 of the opening 14. When the platen 25 moves in a direction towards the distal end 16 of the opening 14, the platen 25 exerts a force on pusher pin 26 causing the ring member 17 to tilt about the X-axis and compress the spring 30. In response to any movement of the control knob 21 in the opposite direction the spring means 34 and compression spring 30 will coact simultaneously to pull the ring member 17 away from the distal end 16 of the opening 14 and tilt the ring member 17 in the opposite direction about the X-axis. The compression spring 30 applies a constant force against the ring member coupled with the reaction of the pusher pin 26 to wedge or lock the ring member 17 in the opening 14. This locking or wedging action while highly desirable for retaining the ring member 17 in any selected stable position prevents normal movement of the ring member 17 in response to rotation of the control knob 21. The spring means 34 applies a steady spring pressure on the ring member 17 at a point intermediate to the leveling screws 22 and 22a of the first and second control means respectively. This constant pressure or eccentric loading by the spring means 34 on ring member 17 causes the ring member 17 to move smoothly in response to movement of the control knob 21. Effectively then, the spring means 34 releases the ring member 17 from the opening 14 by urging the ring member 17 towards the proximal end 15 of the opening 14 whenever the platen 25 moves away from the pusher pin 26.

In a like manner the ring member 17 may be tilted about the Y-axis by movement of the control knob 21a of the second control means. That is rotation of the control knob 21a in one direction causes the leveling screw 22a to travel towards the distal end 16 of the opening 14, while rotation in the opposite direction causes the leveling screw 22a to travel in the opposite direction. The platen 25a fixed to the leveling screw 22a applies the necessary force to the pusher pin 26a in a manner described above to cause the ring member 17 to tilt about the Y-axis. The compression spring 30a which coresponds to compression spring 30 performs in the same manner so that the ring member 17 is locked in any given stable position by the compression springs 30 and 30a.

The ring member 17 may be tilted about the X-axis and Y-axis of the frame 11 into any stable position by the simultaneous operation of control knob 21 and 21a, since the spring means 34 is common to the first and second control means. Thus, only two control knobs 21 and 21a are required to tilt the ring member 17 about the X-axis and the Y-axis and any position intermediate to the X-axis and Y-axis. Accordingly, the optical axis of an optical unit mounted in ring member 17 may be tilted in any given direction by the selected movement of control knobs 21 and 21a. This is an advantage as previously stated, since tilting of the ring member 17 is controlled by only two control knobs which are proximal to each other and are on one side of the frame 11. A further advantage resides in the fact that alignment of the optical axis of an optical unit mounted in the ring member 17 can be achieved without traversing the optical axis, since the control knobs 21 and 21a are on one side of the optical cell 10.

While a preferred embodiment of the invention has been disclosed herein, variation and modifications may become apparent to those skilled in the art. Accordingly, the foregoing description should be taken as illustrative and not in any limiting sense.

What is claimed is:
1. An optical cell comprising
(a) a frame,
(b) a ring member for supporting an optical unit therein,
(c) said frame having a tapered opening for retaining said ring member along the periphery thereof,
(d) spring means connected to said frame and said ring member for resiliently urging said ring member towards the large end of said opening at one given point on said ring member,
(e) first and second control means connected between said frame and said ring member along two transverse axes on said frame for resiliently forcing said ring member toward the small end of said opening, and
(f) said first and second control means including means disposed respectively along different ones of said two transverse axes coacting with said spring means for selectively unbalancing the forces on said ring member to tilt said ring member in the direction of the greatest force on said ring member.
2. An optical cell comprising
(a) a frame,
(b) a ring member for supporting an optical unit,
(c) said frame having a conical seat portion for slideably supporting said ring member thereon,
(d) a spring means connected to said frame and said ring member for resiliently urging said ring member out of said seat portion at one given point on said ring member,
(e) first and second control means connected between said frame and said ring member along two transverse axes for resiliently forcing said ring member towards said seat portion on at least four points on said ring member for retaining said ring member in any stable position in said seat portion, and
(f) each of said first and second control means including means on two of said four points near said one point for selectively unbalancing the forces on said ring member to tilt said ring member about any of said axes.
3. An optical cell comprising,
(a) a frame having an opening of varying diameter,
(b) said opening having a given diameter at a proximal end thereof and a diameter smaller than said given diameter at a distal end thereof,
(c) an optical supporting ring member having a rim portion seated in said opening, said rim portion being curved for swiveling in said opening between said proximal end and said distal end of said opening,
(d) first and second control means mounted on said frame and coupled at least four spaced points to said ring member for yieldingly urging said ring member towards said distal end of said opening.
(e) said first and second means including a control knob on at least two of said four different points for selectively varying the forces on said four different points on said ring member, and
(f) spring means mounted on said frame between said two of said four points for resiliently urging said ring member towards said proximal end of said opening whereby said ring member tilts in the direction of the greatest force on said four points on said ring member.
4. In combination,
(a) a frame having an opening of uniformly varying diameter,
(b) said opening having a given diameter at a proximal end thereof and a smaller diameter than said given diameter at a distal end thereof,
(c) an optical supporting ring member adapted to swivel between said proximal and said distal end of said opening,
(d) first and second control means mounted on said frame and coupled to at least four different points on said ring member for resiliently urging said ring member towards said distal end of said opening,
(e) spring means coupled to said frame and said ring member at another point intermediate, two of said four points for resiliently urging said ring member away from said distal end of said opening, and
(f) said first and second control means including a control knob mounted in said frame and located at two points of said four different points on said ring member for selectively varying the distance between said distal end of said opening and each of said two points on said ring member whereby said ring member tilts with respect to said frame in response to variations of said distance between each of said two points on said ring member and said distal end of said opening.
5. An optical cell comprising,
(a) a frame having an opening,
(b) said opening tapering conically from a given diameter at a proximal end thereof to a smaller diameter at a distal end thereof,

(c) an optical supporting ring having an arcuate rim seated in said opening and being adapted to swivel between said proximal end and said distal end of said opening to align an optical axis of an optical element mounted therein, (d) first and second control means mounted between said ring and said frame for urging said ring toward said distal end of said frame on at least four spaced points on said ring, (e) two of said points being disposed along an X-axis through the center of said ring and the other two of said points being disposed along a Y-axis through the center of said ring, (f) said first and second control means including at least one spring extending between said frame and said ring at one of said X-axis points and at one of said Y-axis for resiliently urging said ring towards said distal end of said opening, (g) said first and second control means each further including pusher means in said frame engaging said ring at the other of said said X-axis points and said Y-axis points for selectively pushing said ring towards said distal end of said opening, and (h) spring means coupled to said frame and said ring at another point between said other X-axis and Y-axis points for yieldably urging said ring away from said distal end of said opening at said another point.

No references cited.

MILTON KAUFMAN, *Primary Examiner.*